(12) United States Patent
Leung et al.

(10) Patent No.: US 6,643,779 B1
(45) Date of Patent: Nov. 4, 2003

(54) SECURITY SYSTEM WITH EMBEDDED HTTP SERVER

(76) Inventors: Brian Leung, Flat A, B, D, 2/F, 36 Tai Yau Street, Wah Hing Industrial Mansion, San Po Kong, Kowloon (HK); Wah Cheong Hui, Flat A, B, D, 2/F, 36 Tai Yau Street, Wah Hing Industrial Mansion, San Po Kong, Kowloon (HK)

( * ) Notice: Subject to any disclaimer, the term of this patent is extended or adjusted under 35 U.S.C. 154(b) by 0 days.

(21) Appl. No.: 09/292,179

(22) Filed: Apr. 15, 1999

(51) Int. Cl.[7] .......................... G06F 11/30; G06F 15/16; H04L 9/00; H04K 1/00
(52) U.S. Cl. ...................... 713/201; 709/230; 713/186; 380/23; 380/25
(58) Field of Search .................................. 713/201, 200, 713/202, 186; 380/25, 23; 709/230

(56) References Cited

U.S. PATENT DOCUMENTS

| | | | | |
|---|---|---|---|---|
| 6,008,805 A | * | 12/1999 | Land et al. ................. | 345/335 |
| 6,067,558 A | * | 5/2000 | Wendt et al. ................ | 709/202 |
| 6,088,450 A | * | 7/2000 | Davis et al. .................. | 380/25 |
| 6,317,777 B1 | * | 11/2001 | Skarbo et al. .............. | 709/204 |
| 6,370,582 B1 | * | 4/2002 | Lim et al. .................... | 709/230 |
| 6,405,245 B1 | * | 6/2002 | Burson et al. .............. | 709/217 |
| 6,484,260 B1 | * | 11/2002 | Scott et al. ................. | 713/186 |
| 2002/0010798 A1 | * | 1/2002 | Ben-Shaul et al. ......... | 709/247 |

* cited by examiner

*Primary Examiner*—Norman M. Wright
(74) *Attorney, Agent, or Firm*—Samuels, Gauthier & Stevens, LLP

(57) ABSTRACT

A security system includes a network adapter that links the security system to a computer network infrastructure to establish a connection to the network. An embedded HTTP server receives and responses to the requests sent from any HTTP client having access to the computer network. A browser-based management module allows any HTTP client that is capable of accessing the computer network to setup and maintain the security system. A browser-based information query module allows any HTTP client that is capable to access the computer network to access the information of the security system.

17 Claims, 2 Drawing Sheets

SECURITY SYSTEM WITH EMBEDDED HTTP SERVER

BACKGROUND OF THE INVENTION

The invention relates to security systems that are ready for internet and intranet access and, more particularly, to such systems that enable any HTTP client, such as a computer running an Internet Browser software package, to setup, maintain and access the information of the systems via internet and/or intranet communication on existing corporate computer networks using standard TCP/IP protocol.

SUMMARY OF THE INVENTION

Businesses, such as banks, financial institutes and law firms, must control employees' access to the business premises, and must ensure that the individual is actually the authorized person. Other business sectors such as manufacturers, also want to keep track of the attendance records of their employees and workers. Today, businesses use a variety of security systems to achieve the purposes. These include systems using traditional passwords or security-access cards, and more advanced biometrics systems such as fingerprint and voice authentication systems. However, each of these systems poses problems.

The existing security systems can provide different security levels to satisfy different security requirements for businesses. But with the exception of the simplest systems such as single password-based stand-alone access-control devices, all these security systems are complicated to setup and maintain, especially for larger-scale security systems that involve more than one security terminal interconnected to form a completed system.

In general, the existing security systems in the market today require dedicated computers connecting to the systems for the setup and maintenance purposes (e.g., new enrollment, withdrawal and other changes of employees' data). The security system must be connected to a dedicated computer via a serial connection (usually in RS-232 or RS-485 standard) or other similar channels using proprietary communication protocol. The dedicated computer must be a PC, running Microsoft Windows 95/98/NT for example, and must be running a special software provided by the vendor of the security systems that works with the proprietary protocol. Such proprietary software and protocol are platform-dependent, and other less-common computer platforms, such as Apple Macintosh and Unix machines, usually cannot do the job due to the lack of support from the vendor.

The setup and maintenance of the dedicated computers, the connections, and the proprietary software are cumbersome and require specialized knowledge to use effectively, and takes a lot of expensive IT times. Also, the additional costs of these dedicated computers and software are expensive.

Besides the problems associated with the setup and maintenance of the existing security systems, it is also difficult and inconvenient for users to access the information of the security systems, such as the access and attendance records of each individual. Generally, a typical security system only generates and sends raw data to the dedicated computer, in a form of simple line-by-line listing of the access log of all individuals in chronological order, in plain ASCII format. Only the dedicated computer can download and collect this raw data. Other computers cannot access the data. The raw data requires another software package to convert the raw data into useful and meaningful information for the management purpose (e.g., to get the attendance reports for an individual of a particular month), and the package is not typically integrated with the software that is used to setup and maintain the security system. Again, this additional software package can only be installed and run on the dedicated computer connected to the security system. And in order for other users in the company to access the information over the corporate computer network (e.g., when the users in the administration department prepare the payroll), the company may need to develop special software to allow other computers to access the information. This again is cumbersome and costs a lot of expensive IT times, and the information collected in this manner is not real-time data as it is not collected directly from the security system, and there is usually a time delay. Users are usually left to guess if the information is accurate and up-to-date or not.

In summary, the problems with the existing security systems today include the difficulties in setting up and maintaining the systems, the failure to utilize the existing computer network resources, the inconvenience for users to access the data and information of the systems, and the incapability for users to get the information in a real-time manner.

These and other objects, features and advantages of the present invention will become apparent in light of the following detailed description of preferred embodiments thereof, as illustrated in the accompanying drawings.

DETAILED DESCRIPTION OF THE INVENTION

Figure 1A:
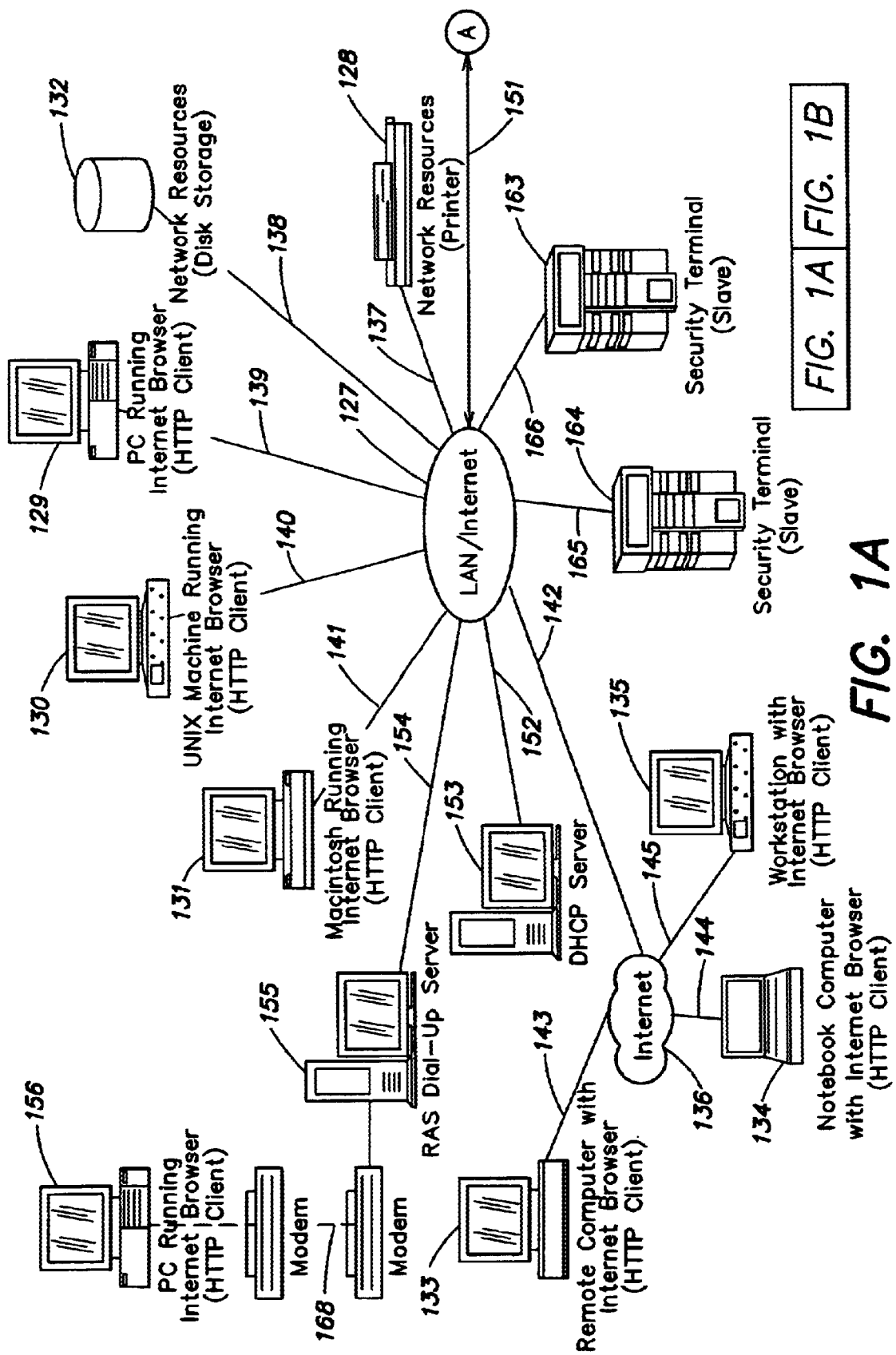
FIG. 1 is a block diagram illustration of a security system according to the present invention.
Figure 1B:
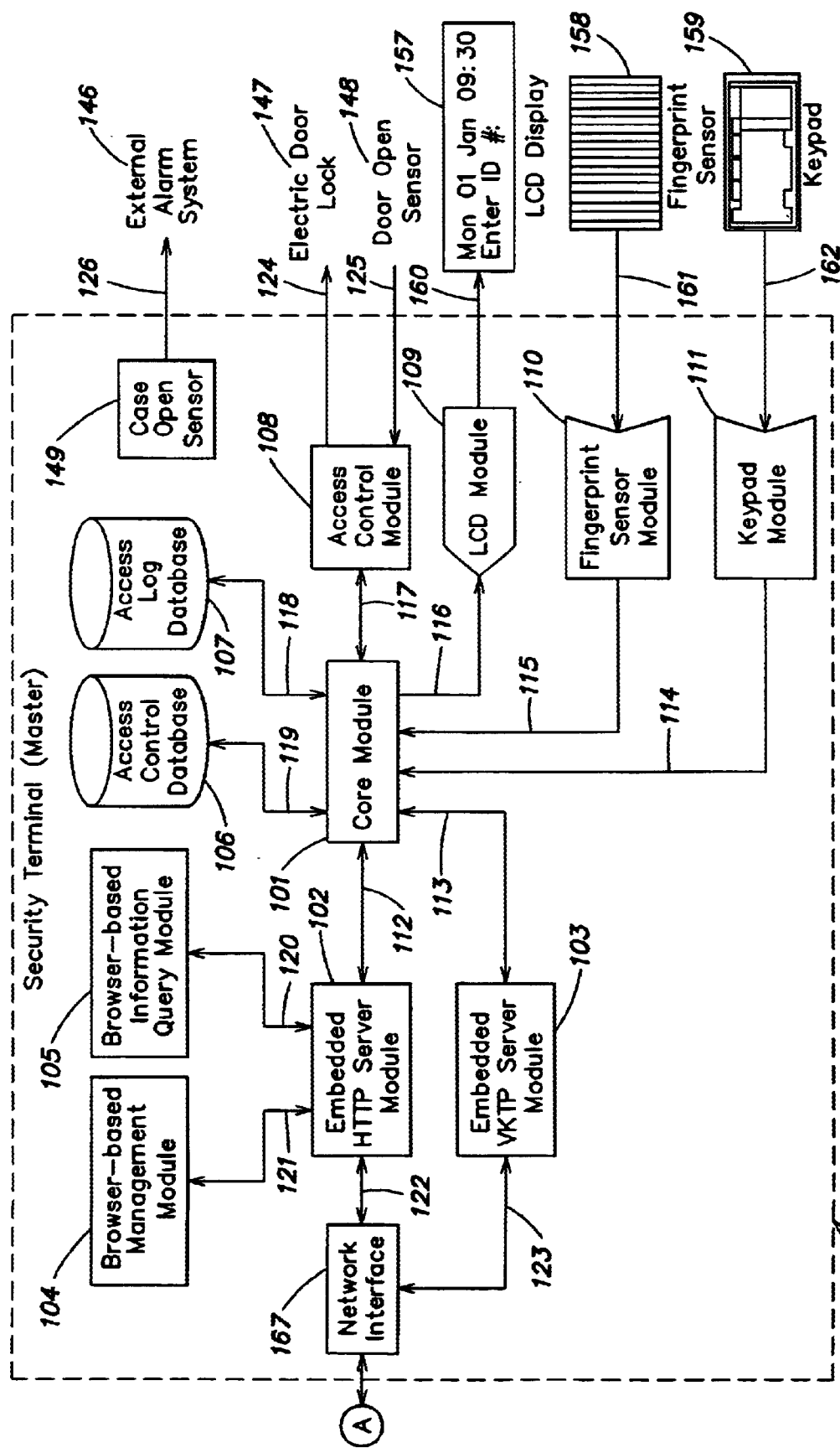

FIG. 1 is a block diagram of a Security Terminal 150 layered over the LAN 127. The connection is established between the LAN 127 and the build-in network adapter 167 via standard 10-base-T wiring 151. In addition to the Security Terminal 150, there are also other devices connected to the LAN 127, including the Apple Macintosh 131, the Unix machine 130, the PC 129, and other network resources (network printer 128 and disk storage 132). In addition, there are two other security terminals 164 and 163 connected to the same LAN 127, and they are configured as slave terminal. The Security Terminal 150 is configured as master terminal.

The LAN 127 is also connected to the Internet 136 via the link 142. This link can be a lease line, a dial-up line, or any other means. Remote computers 133, 134 and 135 are also connected to the internet 136, and they all have the required privilege to access the LAN 127 and the Security Terminal 150.

During the initial setup, an unique IP address must be assigned to the Security Terminal 150, along with other related information such as subnetmask and default gateway address. This can be accomplished by manually entering the IP address through the keypad 159, or if a DHCP server 153 is available on the LAN 127, the IP address can be automatically assigned by the DHCP server 153. However, as this particular Security Terminal 150 is configured as a master terminal (which will be discussed later), it is recommended that the Security Terminal 150 should be assigned a static IP address, so the IP address of the Security Terminal 150 will never change, and other slave terminals 164 and 163 can always find the master Security Terminal 150.

DHCP stands for Dynamic Host Configuration Protocol, which is a protocol that provides dynamic address allocation and automatic TCP/IP configuration.

After obtaining a valid IP address, the communication link 151 between the Security Terminal 150 and the LAN 127 can be established. The user can then use either the Apple Macintosh machine 131, the Unix machine 130, or the PC 129 to run an Internet Browser software package, and to setup, maintain and access the information of the Security Terminal 150 through the Internet Browser. Note that this is platform-independent.

An Internet Browser is a HTTP client, and it sends requests to the embedded HTTP server module 102, that is built-in to the Security Terminal 150. As an example, when the connection between the HTTP client and the Security Terminal 150 is first established (usually by specifying to the Internet Browser the IP address assigned to the Security Terminal 150), the HTTP client usually sends a request for the initial home page to display in the Internet Browser. The embedded HTTP server 102 receives and interprets the request, and then notifies the Browser-based Management Module 104. The Browser-based Management Module 104 then sends the initial home page information to the embedded HTTP server module 102, and it in turn sends the response back to the HTTP client for displaying in the Internet Browser.

The security-related information about the employees is kept in the Access Control Database 106. During initial setup, the user is required to input the employees data. This includes the employee's ID, employee's name, the fingerprint image, the access right, and the valid period of the access right (e.g., one may have the access rights to the premises during weekdays from 8:00 am to 5:00 PM only). The setup procedure is done via the Internet Browser in any one of the computers 130, 129 and 131, in a very user-friendly user interface displayed in the Internet Browser.

The purpose of this particular fingerprint recognition security system is to ensure that the individual trying to enter the premises is actually the authorized person. An Electrical Door Lock 147 is controlled by the Access Control Module 108, and normally the door is locked by the Door Lock 147. During an authentication process, the individual needs to identify himself/herself as an authorized person by first entering his/her employee's ID number via the keypad 159, and then by placing his/her finger to the Fingerprint Sensor 158. The Fingerprint Sensor Module 110 then captures the fingerprint image and passes the image to the Core Module 101. The Core Module 101 then performs a look-up search for the employee in the Access Control Database 106, and if the particular employee ID is found in the Access Control Database 106, compares the captured image with the fingerprint template for that individual stored in the Access Control Database 106. If the captured image and the fingerprint template match, the individual is authenticated and the Core Module 101 instructs the Access Control Module 108 to release the Electrical Door Lock 147.

If the employee's ID is not found, or the captured fingerprint image does not match the fingerprint template of the individual, then the individual is not authenticated, and the Door Lock 147 remains locked. The individual is then unable to enter the premises.

After the individual is authenticated and the Door Lock 147 is unlocked, the Core Module 101 records the data of this authentication incident to the Access Log Database 107. It includes the employee's ID, date and time, as well as the security terminal ID (in the case of multiple security terminals environment, a terminal ID is used to uniquely identify each individual security terminal).

For Security Terminals 164 and 163, that are configured as slave terminals, the new record will also be sent to the master security terminal 150, and be kept in the Access Log Database 107 there. As a result, the Access Log Database 107 of the Master Security Terminal 150 contains all the access log data of all the salve security terminals in the same security system.

The Browser-Based Information Query Module 105 is responsible for converting the raw data in the Access Log Database 107 into information that is meaningful to the users, including access and attendance reports. The computers 156, 130 and 129 can simultaneously request such information through Internet Browser. Each of such computers sends the request to the Embedded HTTP Server Module 102 through the LAN 127. The request usually contains the particular employee's ID, or a group of employees, and the period of time needed. The Embedded HTTP Server Module 102 then collects the required raw data from Access Log Database 107 through the Core Module 101. Then it passes the data to the Browser-Based Information Query Module 105 to convert the data to the information required. After completion, the Embedded HTTP Server Module 102 sends the responses back to the HTTP client, which then displays the query results in the Internet Browser.

The Security Terminal 150, which is configured as Master terminal, is responsible for replicating the data in Access Control Database 106 to other slave security terminals 164 and 163. In the case when a new Slave Security Terminal is connected to the LAN 127, the slave terminal will search for and register with the Master Security Terminal 150. The Master Security Terminal 150 will then upload the data in the Access Control Database 104 to the new Slave Security Terminal.

In addition, should the data in the Access Control Database 106 be updated, the changes will also automatically be sent to all the slave security terminals. As a result, the Access Control Database 106 in all security terminals contain exactly the same data, and should a broken link problem occurs between a security terminal and the LAN 127, the particular security terminal can still function as a stand alone unit, since the employee's data is also kept in its own Access Control Database 106.

The exchange of information between Master Security Terminal 150 and Slave Security Terminals 164 and 163 is preferably performed through the Embedded TP server Module. TP stands for Transfer Protocol" which is an extension of the HTTP protocol, and is developed for this purpose. It enables the Master Terminal to send requests to Slave terminal and vice verse. The following is a summary of the new TP commands:

| TP Command | Brief Description |
| --- | --- |
| VIKING | Initial Command for TP |
| TP/1.0 | Requests TP Version |
| HAVE-STATUS | Header, TP Contains Requestor's Status if field value is "YES" |
| HAVE-ATTACHMENT | Header, TP Contains attachment from Requestor if field value is "YES" |
| REQ-STATUS | Header, Requestor request for Server's Status if field value is "YES" |
| ATTACHMENT-TYPE | Header, describes the type of attachment, tell |

| TP Command | Brief Description |
|---|---|
| | TP server module how to handle the attachment |
| DATABASE | Header Value for ATTACHMENT-TYPE, tell TP Server module to pass the attachment to the Core module |
| ATTACHMENT-LENGTH | Header, describes the length of the attachment |
| CONTENT-LENGTH | Header, describes the length of the TP content |
| STATUS-LENGTH | Header, describes the length of the Requestor's Status Information |
| STATUS | Status, describes the current status for the Unit, for example door open/close, failure, starting, etc . . . |
| SYNCTIME | Status, requests time synchronization between units. |
| DESCRIPTION | Status, a description of the Unit |
| STARTTIME | Status, start up time of the Unit |
| RECORDCOUNT | Status, total record count of the Unit |
| CURRENTTIME | Status, current time when the TP is being prepared |
| ACKNOWLEDGE | TP result, value "OK" indicates the TP is successfully handled, "BAD" indicates the TP fails |
| ATTACHMENT-RESULT | TP's Attachment process result, value "OK" indicates the attachment is successfully handled, "BAD" indicates the attachment is bad or mishandled |

It is possible for a remote computer to access and maintain the Security Terminal 150. In such case, remote computers 133, 134 and 135, that are connected to the Internet 136, can access the Security Terminal 150, and performs all the same maintenance and query operations as the local computers 131, 130 and 129, provided that the LAN 127 is also connected to the Internet 136, and the remote computers have the required privileges to access the LAN 127. With this feature, a company's headquarters located overseas can remotely maintain the local Security Terminal 150, such as withdrawing the access right of an individual in a local site.

Another advantage of implementing the Embedded HTTP Server Module 102 to a security system is that it enables the security system to utilize other network resources available in the LAN 127, including the network printer 128 and the network disk storage 132. All the Security Terminals 150, 164 and 163 can be configured to print the access data to the network printer 128 for each authenticated event, and they can also be configured to backup the Access Control Database 106 and the Access Log Database 107 to the network disk storage 132 periodically and automatically.

It will therefore be seen that we have developed a new security system that includes an embedded HTTP server, that allows platform-independent operations, and that can utilize the existing network resources, and that allows simultaneous accesses by different computers without the need of additional special software package. The terms and expressions employed herein are used as terms of description and not of limitation, and there is no intention, in the use of such terms and expressions, of excluding any equivalent of the features shown and described or portions thereof, but it is recognized that various modifications are possible within the scope of the invention claimed. For example, the Fingerprint Sensor Module 110 can be replaced by a magnetic-card reader, a smart-card reader, or a voice recognition devices. In addition to controlling Electrical Door Lock 147, the security system can also be designed to function as a remote-monitoring security device, with a build-in digital camera for instance, to remotely monitor a remote site via an Internet Browser.

In the block diagram (FIG. 1), the communication link 151 between the LAN 127 and the network adapter 167 is established using standard well-known 10-base T connection with physical wiring. However alternatively other communication links, such as wireless LAN, can be used.

Furthermore, although the security system has built-in features to utilize the network printer 128 and disk storage 132, additional network resources can also be utilized, such as the corporate centralized database (ODBC-compatible database for example).

What is claimed is:

1. A security system, comprising:
    a network adapter that links the security system to a computer network infrastructure to establish a connection to the network;
    an embedded HTTP server that receives and responds to the requests sent from any HTTP client having access to the computer network;
    a browser-based management module that allows any HTTP client that is capable of accessing the computer network to setup and maintain the security system; and
    a browser-based information query module that allows any HTTP client that is capable to access the computer network to access the information of the security system.

2. The security system defined in claim 1, wherein the embedded HTTP server enables different kind of computers, such as Apple Macintosh, Unix machine, or PC running Microsoft Windows 95/98/NT, to connect to and to access the security system, and to setup, maintain and access the information of the security system, through the standard Internet Browser, i.e., it enables platform-independent operations.

3. The security system defined in claim 1, wherein the embedded HTTP server allows any number of computers to simultaneously access the security system.

4. The security system defined in claim 1, wherein the embedded HTTP server can utilize the existing network resources such as network printers and disk storage.

5. The security system defined in claim 1, wherein the embedded HTTP server enables remote computers to perform remote access from remote sites through standard Internet Browser.

6. The security system defined in claim 1, wherein the embedded HTTP server eliminates the needs for a dedicated PC to connect to and to access the security system.

7. The security system defined in claim 1, wherein the embedded HTTP server eliminates the needs for special software packages to connect to and to access the security system.

8. The security system defined in claim 1, wherein the browser-based management module includes the management software, that enables the use of Internet Browser to setup and maintain the security system.

9. The security system defined in claim 1, wherein the browser-based management module includes the management software, that eliminates the needs for any additional management software packages to setup and maintain the security system.

10. The security system defined in claim 1, wherein the browser-based management module enables any number of computers to simultaneously setup and maintain the security system.

11. The security system defined in claim 1, wherein the browser-based information query module includes the software to retrieve the information, that can dynamically generate real-time access and attendance reports from the raw data stored in the access log database of the security system.

12. The security system defined in claim 1, wherein the browser-based information query module allows users to access the information of the security system through Internet Browser.

13. The security system defined in claim 1, wherein the browser-based information query module enables any number of computers to simultaneously access the information on the security system.

14. The security system defined in claim 1, wherein the embedded TP server module implements the proprietary TP protocol to allow the exchange of data between master security terminal and slave security terminal automatically without user interference.

15. The security system defined in claim 1, wherein the embedded TP server module enables synchronization of Access Control data across all the security terminals in the same LAN.

16. The security system defined in claim 1, wherein the embedded TP server module allows a centralized database of the access records of the whole security system, by enabling the Master security terminal to collect the access records of all the Slave security terminals.

17. The security system of claim 1, further comprising an embedded TP server module that provides proprietary data exchange protocol for communications and data exchange between Master security terminal and Slave security terminal.

* * * * *